M. E. HUNTER.
EYEGLASS MOUNTING.
APPLICATION FILED MAY 3, 1912.
1,050,943.
Patented Jan. 21, 1913.
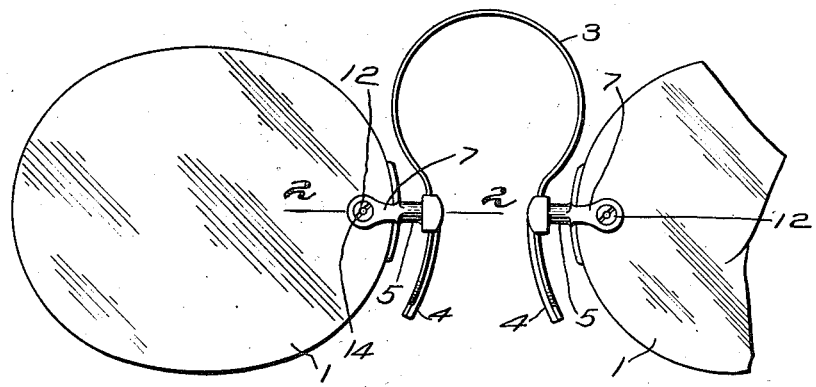
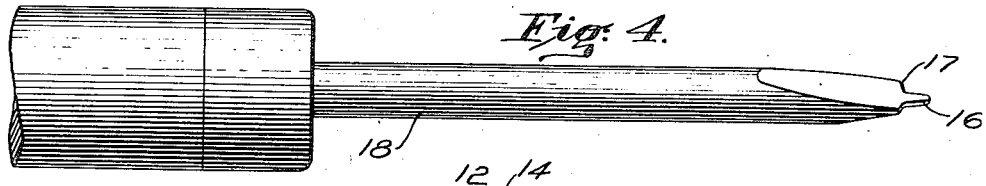
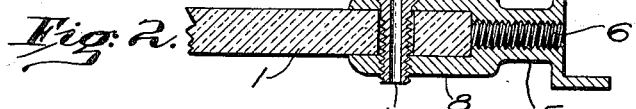
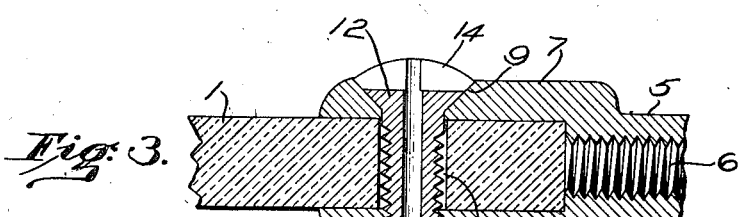
Witnesses:
Inventor:
Maurice E. Hunter,
by Robt. P. Hains,
Atty.

UNITED STATES PATENT OFFICE.

MAURICE E. HUNTER, OF BEVERLY, NEW JERSEY.

EYEGLASS-MOUNTING.

1,050,943.

Specification of Letters Patent. Patented Jan. 21, 1913.

Application filed May 3, 1912. Serial No. 694,834.

*To all whom it may concern:*

Be it known that I, MAURICE E. HUNTER, a citizen of the United States, and a resident of Beverly, in the county of Burlington and State of New Jersey, have invented an Improvement in Eyeglass-Mountings, of which the following description, in connection with the accompanying drawings, is a specification, like letters on the drawings representing like parts.

The invention to be hereinafter described relates to eyeglass mountings and more particularly to the means employed for connecting the lens to its support or nose-piece. As well known by those skilled in the art, much difficulty has been experienced in the means employed for connecting the glass or lens of rimless eyeglasses to the nose or bridge-piece by which such glass is supported. By reason of the light and delicate nature of the parts and the fact that the glass or lens in connected to its support by a device passed through the material of the glass or lens at a single point, the glass or lens is liable to become loose in use, and if attempt be made to secure the parts together by the exercise of force during the act of assembling, breakage is liable to occur. Attempts have been made to overcome these and other defects in eyeglass mountings well known to those skilled in the art, and as one means it has been suggested to employ two screws, a male and a female member, one of which would be provided with both an external and internal screw thread and the other with an external thread to engage the internal thread of the first member, said screws being passed through the holding lugs and glass from opposite sides. In practice, however, this construction is not only expensive to manufacture, but the male member of the screw is liable to work loose and finally permit both members to back out and release or partially release the glass. Rivets have been tried, but they also permit looseness and in assembling the parts and turning down the rivet heads the glass or lens is liable to be broken, and, moreover, should it be desirable to subsequently adjust the glass or lens in its support or nose-piece, the entire rivet must be removed with the attendant danger of glass or lens breakage. Other objections exist to the use of these devices, and with the above in view the aims and purposes of the present invention are to provide means whereby the glass or lens may be assembled and secured to its holder or nose-piece without danger of breaking the same, and wherein the parts may be rigidly held together, looseness of the parts in use avoided, and provision be made to permit accurate adjustment at any time, all of which will be more fully understood from the following description and accompanying drawings of one form of means for carrying the invention into practical effect, it being understood that in its true scope the invention is definitely pointed out by the claims.

In the drawings:—Figure 1 is a front view of an eyeglass containing the present invention, one of the glasses or lens being broken away. Fig. 2 is a section on line 2—2, Fig. 1, the parts being shown on a larger scale, and showing the fastening screw prior to its being beaded or burnished. Fig. 3 is a section similar to that of Fig. 2, on a somewhat larger scale, showing the relation of parts after the end of the screw has been burnished. Fig. 4 shows a convenient form of burnishing tool for burnishing the end of the screw.

The glasses or lenses 1 may be of any usual or desired character, as may also be the nose or bridge-piece 3 and its nose engaging arms 4. Extending from the nose or bridge-piece 3 in opposite directions and appropriately secured in any approved manner thereto are the glass or lens supports 5 which may be of any approved form or character. As shown, these supports are internally threaded at 6 to receive the screws or fastening means by which the nose-piece and arms may be secured thereto, but as the details of these features form no essential part of the present invention and may be of any desired character, no further description is necessary.

The supports 5 and the means for securing the glasses or lenses thereto may be similar; therefore, a description of one will serve to make clear these features of the present invention.

The support 5, regardless of its particular form, is provided with straps or lugs 7 and 8 to embrace between them the edge portion of the glass or lens 1 as indicated in Figs. 2 and 3. One of the lugs, as 7, is provided with a seat 9 preferably formed to receive the head of a screw to be described, and the opposite lug 8 is provided with screw threads 10, best shown by the enlarged Fig. 3. The glass or lens 1 is provided with an opening 11, which, when assembled in relation with the support 5, is alined with the holes in the lugs 7 and 8 formed by the seat 9 and screw threads 10.

In order to secure the lens to its support the present invention contemplates a screw 12, the external screw threads of which are adapted to engage the screw threads 10 in the lug 8, it being understood that the opening 11 through the glass or lens is of such size as to readily permit the passage of the screw, substantially as indicated in Fig. 3. The screw 12 is formed with a longitudinal bore or opening 13 which may extend through the entire length of the screw, although its length from the unheaded portion of the screw may be varied, so long as at its unheaded portion the screw is hollow. The screw is provided with a head 14 having a cross-cut to be engaged by a suitable screw driver for manipulating the screw. From the construction thus far described, it will be apparent that the screw 12 may be passed through the parts as indicated in Figs. 2 and 3, and that by a suitable screw driver it may be turned to cause the threaded engaging portions of the screw and the lug 8 to draw the lugs 7 and 8 snugly upon the sides of the glass or lens.

It is one of the purposes of the present invention to prevent the screw from becoming loose or loosening the hold of the lugs 7 and 8 upon the glass or lens, and to this end the screw is formed of metal, preferably of soft character, which will bend somewhat without breaking, the construction being such that after the screw has been turned or screwed to place and has drawn the flanges or lugs 7 and 8 upon the glass or lens surface with proper holding pressure, the hollow unheaded end of the screw is burnished or beaded over, as indicated in Fig. 3, whereby the metal at said end is flared outwardly at 15, Fig. 3, to overlie the outer thread of the lug 8. The effect of this is that a proper hold of the glass or lens by the lugs 7 and 8 is secured and any turning movement of the screw tending to loosen the parts in use is prevented by the bead or burnished portion at the unheaded end of the screw engaging the exterior surface of the lug 8. Since the parts can become loose only by turning movement of the screw, it will be noted that the construction described furnishes not only a means permitting delicate adjustment and proper holding pressure of the lugs 7 and 8 upon the glass or lens, but in addition thereto the bead or burnished end of the screw serves to hold the screw securely in its final adjusted position and to prevent rotative movement thereof.

Inasmuch as the material of the screw is soft metal, the beading or burnishing of the hollow unheaded end portion is readily effected, as by a tool 18, such as shown by Fig. 4, wherein the pointed end 16 may engage the opening 13 of the screw to properly center the tool and the shouldered portions 17, by slight pressure and turning movement will serve to burnish over or form the bead 15 at the hollow unheaded end of the screw. During this burnishing or beading operation the screw will remain in the position to which it has been driven by the screw driver in setting up the parts, and by virtue of the burnished or beaded end formed on the screw by the tool, the screw and perforce the parts through which it passes, will remain fixed in their relative positions in use. Should it be desired to readjust the glass or lens in its support, or should the glass or lens become unserviceable, the screw 12 can be backed out from its holding position, Fig. 3, by means of a screw driver, the soft metal bur or bead at the unheaded end of the screw bending inward under the force applied to turn the screw. Thus, while the bead or bur at the hollow unheaded end of the screw will maintain the screw in position and avoid loosening of the parts in use, it will, nevertheless, yield and bend under the unusual force applied by a screw driver, so that the screw can be backed out to permit adjustment or replacement of the glass or lens, and then be screwed to place and beaded over as before without danger of breaking the glass or lens.

What is claimed is:

1. In an eyeglass mounting, the combination of a glass or lens, a support therefor having a lug at each side of said glass or lens, one of said lugs being screw threaded, and a screw having a hollow unheaded end to engage the screw threaded lug, said screw having its hollow unheaded end burnished over to form a bead or bur.

2. In an eyeglass mounting, the combination of a glass or lens, a support therefor having lugs embracing said glass or lens, one of said lugs having a screw head seat and the other of said lugs having a screw thread, a screw passing through said lugs and glass or lens and having a head seated in said screw head seat and its end portion engaging the screw threads of the other of said lugs to draw the parts into holding relation, said end portion of the screw being hollow and burnished over to form a bur.

3. In an eyeglass mounting, the combination of a glass or lens, a support embracing said glass or lens, and a hollow screw passing through said support and lens, and having its unheaded end burnished over to form a bead or bur.

In testimony whereof, I have signed my name to this specification, in the presence of two subscribing witnesses.

MAURICE E. HUNTER.

Witnesses:
 H. D. DETWILER,
 H. A. BROWN.